May 7, 1963 D. E. RICHARDSON 3,088,408
MECHANICAL TIME DELAY DEVICE
Filed May 22, 1957 3 Sheets-Sheet 1

INVENTOR.
DONALD E. RICHARDSON
BY
ATTYS.

May 7, 1963

D. E. RICHARDSON 3,088,408

MECHANICAL TIME DELAY DEVICE

Filed May 22, 1957

*INVENTOR*
DONALD E. RICHARDSON

BY

*ATTORNEYS*

United States Patent Office 3,088,408
Patented May 7, 1963

3,088,408
MECHANICAL TIME DELAY DEVICE
Donald E. Richardson, Chicago, Ill., assignor, by mesne assignments, to the United States of America as represented by the Secretary of the Navy
Filed May 22, 1957, Ser. No. 660,990
8 Claims. (Cl. 102—70.2)

This invention relates generally to timing systems, and more particularly to a dispersal time delay mechanism and associated circuitry for use in an aircraft launched ordnance vehicle.

More specifically, the time delay apparatus according to the present invention provides for selective control of the dispersal actuator of the submissiles, or scatter bombs, carried by an aircraft launched cluster bomb. The instant time delay apparatus is especially adapted to be used with a cluster bomb of the character disclosed in the copending application of Fred Brown and H. J. Thomiszer, Serial No. 622,511, filed November 15, 1956, for Interlocking Screw Threads, and may be used to actuate either a clam shell type of submissile dispersal actuator, as disclosed in the copending application of George L. Pigman, Serial No. 597,831, filed July 13, 1956, now Patent No. 2,970,542 on a Primacord type of submissile dispersal actuator, as disclosed in the copending application of Fred Brown, Serial No. 597,313, filed July 11, 1956, now Patent No. 3,016,011.

Prior systems for initiating dispersal of cluster bomb type submissiles, or multiple projectiles, have employed plummet devices suspended from a parachute type bomb, or ordnance fuzes, such for example as the proximity fuze. Additionally, time delay devices actuable at the instant of release of the cluster bomb from the parent aircraft have also been utilized.

Although the prior art systems hereinabove described have performed satisfactorily, certain inherent disadvantages and limitations of these systems have necessitated the development and utilization of new and improved timing apparatus. For example, the plummet devices have not been found to be readily adaptable for use in bombs launched at high speeds from aircraft, such for example as in a dive bombing run, whereas the proximity fuzes have been found to be susceptible to actuations by cluster bombs launched by other aircraft in the vicinity thereto. In addition, the proximity fuzes have been found to be susceptible to enemy countermeasure tactics. In the utilization of the hereinabove described time delay devices, it has been found necessary to make elaborate computations prior to the release of the bomb from the aircraft in order to obtain the desired dispersal distance from ground accuracies.

The cluster bomb with which the dispersal time delay device of the instant invention is adapted for use utilizes means carried by the bomb and including pilot missiles dischargeable therefrom prior to, or during, the free flight of the bomb along the trajectory thereof for providing an accurate determination of the slant range of the bomb, either continuously or at various time intervals, during travel along the trajectory, and providing suitable intelligence for dispersal of the submissiles at the most effective dispersal distance from the ground thereby effecting a more effective submissile dispersal pattern in the target area.

More specifically, the cluster bomb system with which the instant invention is intended for use is launched from an aircraft during a dive bombing run. At release, a static line connected to the aircraft releases triggering means arranged on the bomb for actuating a pair of one-shot magneto type electrical impulse generators. The impulse developed by one of the magnetos ignites a squib for explosively actuating a device for releasing a normally restrained escapement mechanism of the instant timing device thereby initiating the operation thereof. The impulse developed by the other magneto ignites another squib for effecting the firing of the pilot projectile gun at the instant of bomb release and prior to the impartation of any rotation to the bomb by the canted fin structure carried thereby. A predetermined time after the firing of the pilot projectile from the gun, a miniaturized transmitter carried thereby begins to transmit intelligence signals. An initially inoperative receiver carried by the cluster bomb is rendered operative shortly thereafter by the instant timing device for reception of the transmitted signals. A predetermined time interval after the pilot projectile strikes ground, with the consequent cessation of signal transmission, the instant timing device effects dispersal of the submissiles carried by the cluster bomb.

Accordingly, a principal object of the present invention is to provide a new and improved timing device particularly suitable for use in a cluster bomb.

Another object of the present invention is to provide a new and improved time delay mechanism selectively responsive to a plurality of explosive actuations.

Still another object of the present invention resides in the provision of a new and improved mechanical timing assembly for effecting selective operation of an electrical control circuit.

A further object of the present invention resides in the provision of a compact and reliable time delay dispersal mechanism.

Other objects and many of the attendant advantages of the present invention will be more readily appreciated as the same becomes better understood by reference to the following detailed description when considered in connection with the accompanying drawings wherein.

Figure 1:
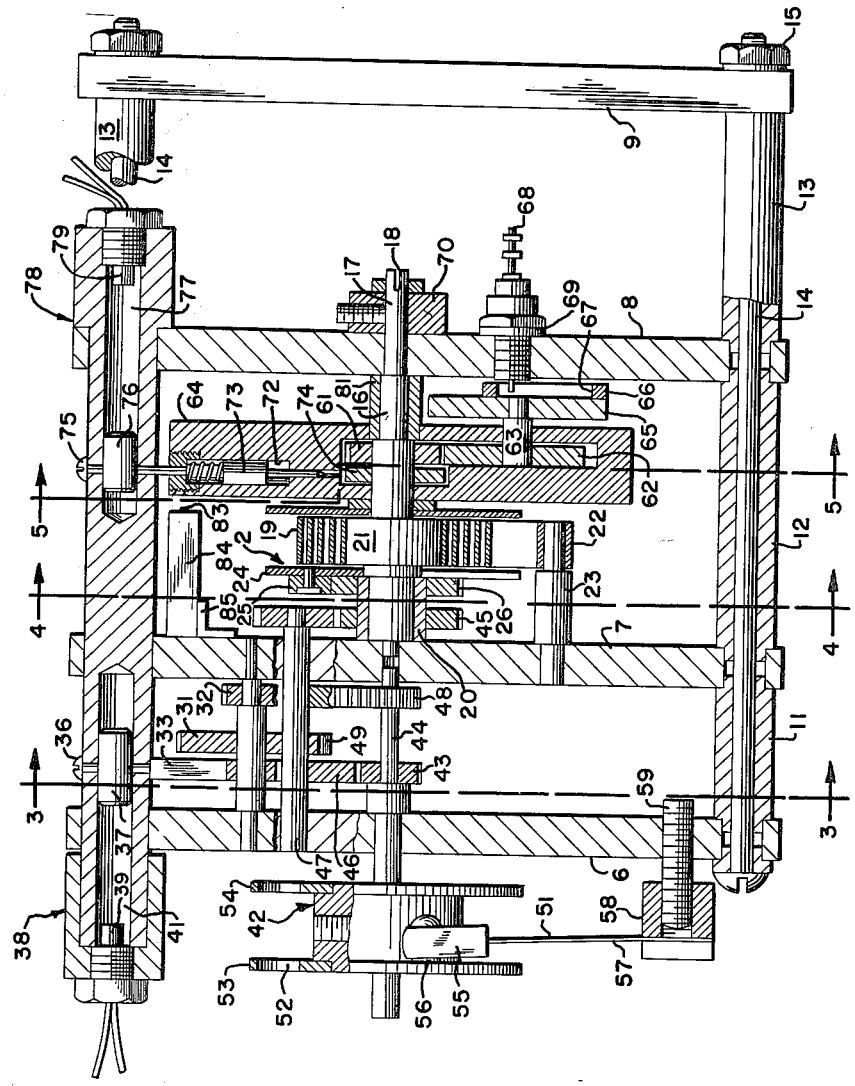
FIG. 1 is an elevational view partially in section of the time delay mechanism of the instant invention.
Figure 2:
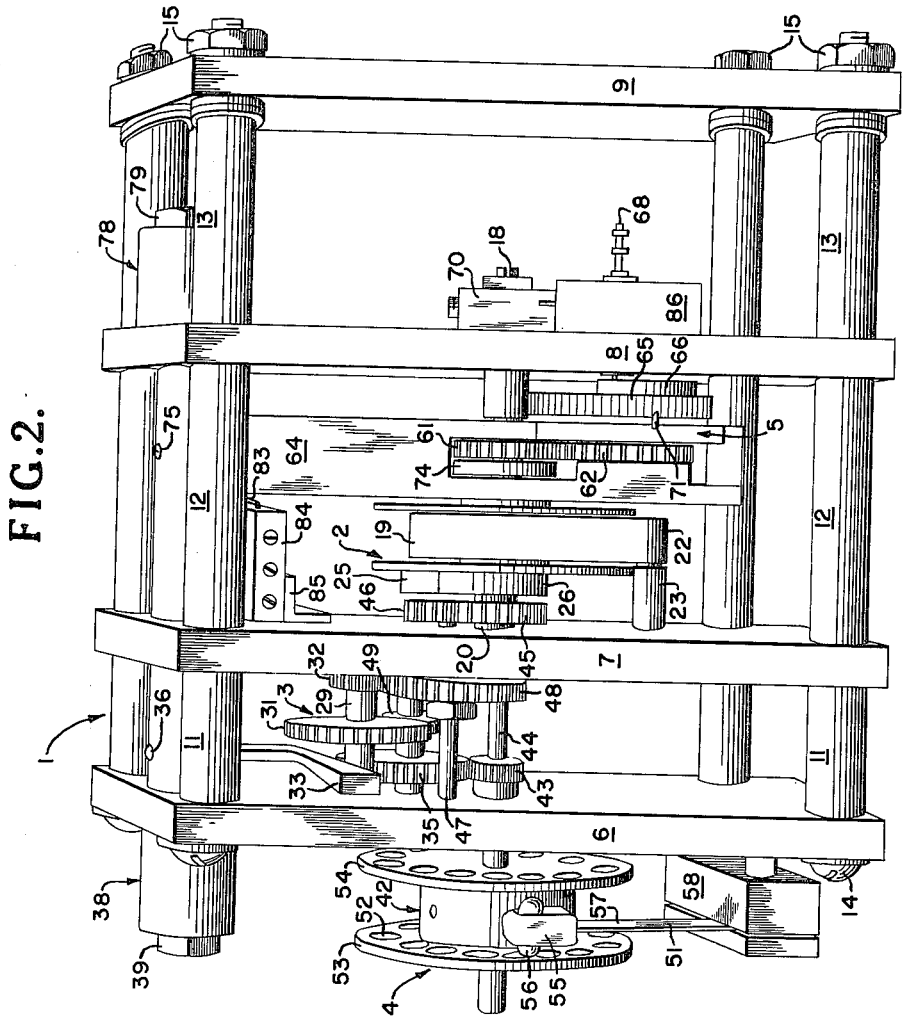
FIG. 2 is a view in perspective of the time delay mechanism of FIG. 1.

Referring now to the drawings wherein like reference characters indicate like parts throughout the several views, and more particularly to FIGS. 1 and 2 whereon the mechanical time delay mechanism according to the instant invention is indicated generally by reference numeral 1. The assembly 1 generally comprises a spring motor, or drive, 2, a power gear train 3, an escapement mechanism 4, and a cam assembly 5. The assembly 1 is also provided with a plurality of supporting plates, or members, 6, 7, 8, and 9. The supporting members are spatially assembled by means of sleeve type spacers 11, 12 and 13 which are clamped in aligned relation by means of through bolts 14 and associated nuts 15. One set of bolts and spacers is provided at each of the four corners of the assembly 1.

Figure 3:
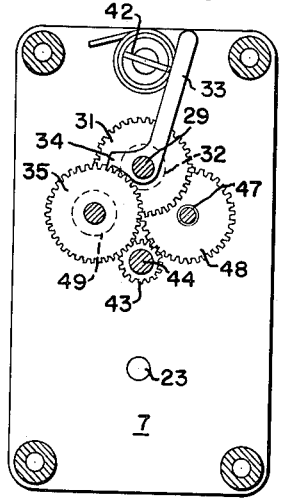
FIG. 3 is a sectional view taken along line 3—3 of FIG. 1.
Figure 4:
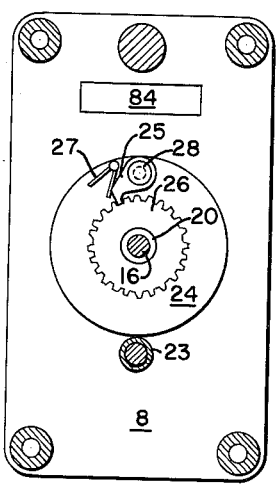
FIG. 4 is a sectional view taken along line 4—4 of FIG. 1.

As more clearly shown in FIGS. 1, 3 and 4, the spring drive arrangement 2 includes a drive shaft 16 suitably journalled between the plates 7 and 8 and having an extension formed thereon at 17 for a slot 18 suitable for the reception of a winding key. Also included is a spiral spring 19 having its inner convolution affixed to an enlarged portion 21 of the drive shaft, while the outer convolution of the spring 19 terminates in a loop 22 which is anchored to post 23 affixed in plate 7. A sleeve 20 on shaft 16 carries a cylindrical disc 24 to which is attached a winding dog 25 which is spring loaded into operative engagement with the teeth of ratchet gear 26 by a hairpin type spring, or the like, at 27. The dog 25 is retained by the shoulder head screw 28 to permit winding of the spring 19 by key 18 against the resistance of the power gear train 3, and upon release of the initially locked gear train 3, to effect an operational interconnection between the spring drive 2 and the escapement mechanism 4, as will be more fully explained hereinafter.

The power gear train 3 includes shaft 29 journalled between plates 6 and 7, and having fixedly mounted thereon gears 31 and 32. There is also provided on shaft 29 a lever, or latch, arm 33 having a dog 34 formed therein. The dog 34 is normally retained in restraining engagement with the teeth of gear 35 by a shear pin 36 affixed to the arm 33 and extending through the plunger 37 of an explosive actuator, generally indicated by the reference numeral 38. The explosive actuator 38 includes an electroresponsive squib 39 arranged in a chamber 41, which upon ignition thereof effects shearing of the pin 36 by plunger 37 whereupon the arm 33 releases gear 35 to drive escapement wheel 42 through pinion gear 43, said wheel and pinion being fixedly mounted on drive shaft 44. The spring motor 2 drives the escapement wheel 42 through gears 45 and 46, respectively mounted on sleeve 20 and gear shaft 47, and gears 48 and 32, respectively mounted on gear shaft 47 and shaft 29. Upon operation of the explosive actuator device 38, gears 31 and 49 transmit the force of drive motor 2 to gear 35 and thereupon to the escapement mechanism 4.

The escapement mechanism 4 includes a vibrator 51 and the escapement wheel 42 hereinbefore referred to. The wheel 42 is arranged as a spool having a plurality of equidistantly spaced holes 52 formed upon each of the spool faces 53 and 54 thereof. The vibrator 51 consists of a mass 55 having a double pointed cam, or pin, 56 extending therethrough, said mass being affixed to one end of a leaf spring 57. The leaf spring 57 is suitably attached to plate 6 by means of clamp block 58 which is retained by suitable means, such for example as bolt 59, to plate 6. It will be apparent to one skilled in the art that upon the application of a driving force to rotate spool 42, the vibrator 51 will oscillate between the holes 52 of the spool faces 53 and 54 thereby functioning as an escapement mechanism for regulating the driving power provided by spring motor 2.

As the spring motor drives through power gear train 3 to rotate escapement spool 42, drive shaft 16 carrying the drive spring 19 also functions to effect rotation of gear 61 affixed thereto at a metered rate determined by the escapement mechanism 4. The gear 61 is in engagement with gear 62 which is mounted on a shaft 63 carried by cam arm, or bracket, 64 of cam assembly 5. Rotatably mounted on shaft 63 is an indexing dial 65 having mounted upon a face thereof cricular cam 66. Cam 66 has an internal contact surface at 67 for engaging the stationary electrical contact 68 affixed to plate 8 by means of insulating bushing 69. The indexing disc 65 in cooperation with pointer, or indicator arm, 71 formed upon cam arm 64 provides a means for adjusting the operational relationship between the stationary contact 68 and the cam contact surface 67.

Figure 5:
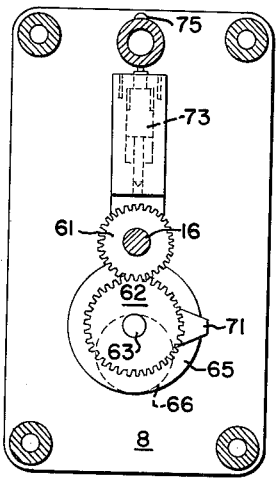
FIG. 5 is a sectional view taken along line 5—5 of FIG. 1.

As more clearly shown on FIGS. 1 and 5, a chamber, or bore, 72 is formed within the cam bracket 64 wherein a spring loaded plunger 73 is slideably disposed in operative alignment with locking wheel 74 fixedly mounted on drive shaft 16. The plunger 73 is normally restrained from engagement with the wheel 74 by means of shearing pin 75 affixed thereto and extending through the plunger 76 slideably disposed in the firing chamber 77 of an explosive actuator, generally indicated at 78. The explosive actuator 78 includes an electroresponsive squib 79 arranged within chamber 77, which upon being ignited imparts a propelling force to the plunger 76 whereupon pin 75 is severed. Upon severance of shear pin 75, cam arm 64 is detached from the assembly 1 frame and the plunger 73 is spring urged into engagement with wheel 74. This engagement functions to fix, or lock, the cam arm 64 in driving arrangement with the drive shaft 16 thereby providing for the clockwise rotation of the cam arm 64 by the spring motor about the bearing sleeve 81, which provides the mounting for the cam arm 64. Inasmuch as both the shaft 16 and arm 64 are turning in a clockwise direction, the internal contact surface 67 of circular cam 66 moves away from the stationary contact 68 by the counterclockwise rotation thereof about the shaft 63. The result of this operation is that the contact surface 67 has a long-radius return motion towards engagement with the stationary electrical contact 68, of the dispersal control circuit 82, now to be described more fully hereinbelow. Additionally, the initial rotation of cam arm 64 operates to close the contacts 83 of an electrical microswitch 84 of the control circuit 82 mounted upon plate 7 by means of bracket 85.

Figure 6:
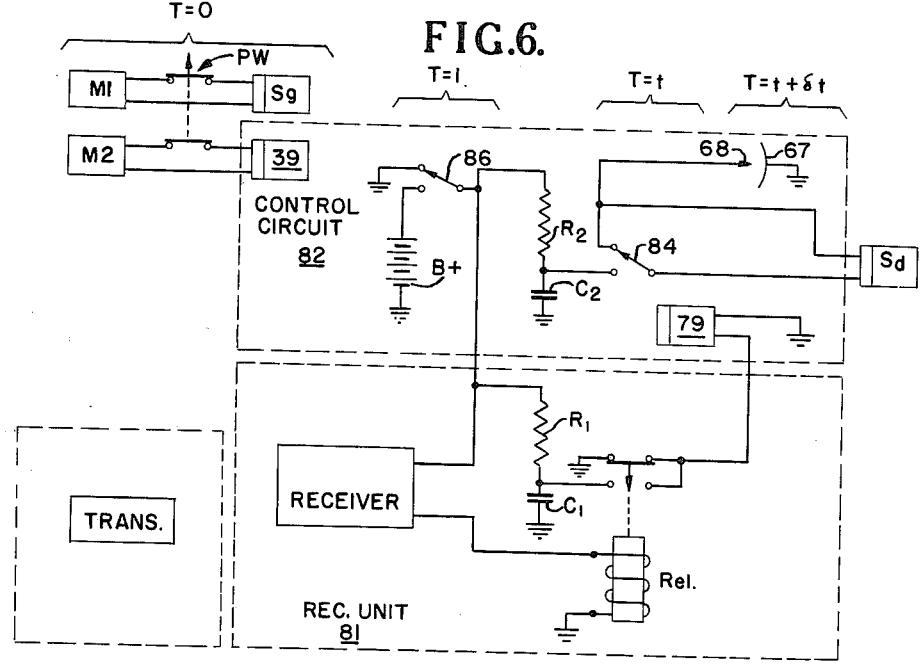
FIG. 6 is a diagrammatic illustration of the electrical control circuit employed adjunctively with the mechanism of FIG. 1.

Referring now to FIG. 6 of the drawings wherein the basic components of the electrical control circuit 82 are shown together with other circuitry associated therewith in the dispersal system for the cluster bomb. It is to be noted that for the purpose of facilitating the understanding of the control circuit, the componential elements thereof are arranged from left to right in accordance with their time order of operation.

At the time $T=0$, corresponding to the instant of cluster bomb release from the aircraft, each of two magneto units, indicated generally as $M_1$ and $M_2$ are mechanically triggered to generate electrical impulses. The electrical impulse generated by magneto $M_1$ is transmitted through a safety pull wire switch PW to effect ignition of the pilot projectile gun explosive actuator, or squib, $S_g$, whereupon the pilot projectile is ejected from the cluster bomb. These mechanisms do not form a part of the instant invention. The impulse generated by magneto $M_2$ is likewise transmitted through the safety switch PW to ignite squib 39 of the mechanical assembly 1 whereupon the initially restrained power gear train 3 is rendered responsive to the spring motor 2 and escapement mechanism 4, in the manner as described hereinbefore. At time $T=1$ sec., energy storage capacitors $C_1$ and $C_2$ are connected to ground, or common, through resistors $R_1$ and $R_2$, respectively through microswitch 86. The metered rotation of shaft 16 functions to rotate cam 70 to operate electrical switch 86 in a manner to remove the safety ground from the capacitors $C_1$ and $C_2$ and to connect said capacitors through their respective charging resistors $R_1$ and $R_2$, and in addition, the radio receiver Receiver, to the cluster bomb power supply B+. The energized receiver Receiver is receptive to the radiated signals of a radio transmitter Trans. arranged in the pilot projectile. As the pilot projectile strikes the ground, at time $T=t$, the radiated signal ceases due to demolition of the transmitter whereupon the receiver Receiver in the cluster bomb actuates a relay Rel. to place the squib 79 across charged capacitor $C_1$ whereupon the squib 79 is ignited. As described hereinbefore, ignition of squib 79 effects the release of cam arm 64 from the assembly 1 frame and locks the cam arm gears 61 and 62 to the cam arm itself, whereupon the cam arm 64 starts to rotate. As the cam arm starts to rotate, it effects actuation of a microswitch 84 to remove the safety short connection from the submissile dispersal squib, $S_d$ and to partially complete the discharge circuit from charged capacitor $C_2$ to the squib $S_d$. At a time $T=t+\delta t$ sec., as determined by the metered rotation of cam arm 64, and the preselected time delay setting of index dial 65 and pointer 71 of cam assembly 5, contact surface 67 engages stationary contact 68 thereby completing the discharge path between capacitor $C_2$ and squib $S_d$. Ignition of squib $S_d$ actuates the submissile dispersal mechanism whereupon release and dispersal of the submissiles carried by the cluster bomb is effected.

The radioreceiving unit Rec. Unit shown in FIG. 6 does not form a part of the instant invention but is shown merely to provide a better understanding of the manner of operation and utilization of the timing unit of the instant invention to effect cluster bomb dispersal.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A timing mechanism for sequentially actuating a plurality of circuit closure means comprising a spring wound power drive mechanism, an escapement mechanism connectable to said power drive mechanism for controlling the operation thereof, normally restrained power drive translational means for operationally interconnecting said power drive and escapement mechanism subsequent to release thereof, means for releasing said translational means, cam disc means rotatable by said drive mechanism subsequent to release of said translational means for actuating a first one of the circuit closure means, normally restrained cam arm means rotatable by said drive mechanism subsequent to the release of said cam arm means and said translational means for actuating a second one of the circuit closure means, circular cam means rotatably arranged on said cam arm means for actuating a third one of the circuit closure means a predetermined time after release of said cam arm means, and means for releasing said cam arm means.

2. A timing mechanism for sequentially actuating a plurality of circuit closure means comprising power drive means, initially restrained escapement means for controlling the driving rate of said power drive means upon release thereof, first shearable means for initially restraining said escapement means and upon shearing thereof for releasing said escapement means, first explosive means for effecting shearing of said shearable means, first camming means adaptable to being driven by said power drive means upon release of said escapement means for actuating a first one of the circuit closure means, initially restrained second camming means adaptable to being driven by said power drive means upon release thereof and of said escapement means, said second camming means including a rotatable cam arm for actuating a second one of the circuit closure means upon commencement of rotation thereof, and a circular cam mounted upon one extremity of said cam arm for actuating a third one of the circuit closure means in response to a predetermined magnitude of rotation of said cam arm, second shearable means for initially restraining said second camming means and upon shearing thereof for releasing said second camming means, and second explosive means for effecting shearing of said second shearable means subsequent to the shearing of said first shearable means.

3. A timing mechanism according to claim 2 wherein said second camming means includes means for presetting the degree of rotation of said cam arm in response to which said circular cam arm actuates a third one of the circuit closure means.

4. A timing mechanism according to claim 3 wherein said escapement means further includes a power gear train for transmitting the controlling effect of said escapement spool and said oscillating mass to said power drive means.

5. A timing mechanism according to claim 2 wherein said cam arm of said camming means includes a co-actable wheel and spring urged plunger for rendering said cam arm rotatably responsive to said power drive means.

6. A timing mechanism according to claim 2 wherein said power drive means includes a spiral spring, and means for effecting winding of said spiral spring.

7. A timing mechanism according to claim 2 wherein said escapement means includes an escapement spool and an oscillating mass adaptable to engage said spool at a predetermined rate thereby to regulate the controlling effect of said escapement means upon said power drive means.

8. A time delay system comprising a spring wound power drive mechanism, an escapement mechanism connectable to said power drive mechanism for controlling the operation thereof, normally restrained power drive translational means for operationally interconnecting said power drive and escapement mechanisms upon release thereof, first explosive responsive means for effecting release of said translational means, normally ineffective electrical circuit means including a plurality of switches adapted to being sequentially actuated in predetermined time delayed relationship for rendering said electrical circuit effective, camming means adaptable to being driven by said power drive mechanism for rendering said electrical circuit means effective, said camming means including a cam disc rotatable by said drive mechanism subsequent to release of said translational means for actuating a first one of said plurality of switches, an initially locked cam arm being rotatable by said drive mechanism upon release thereof for actuating a second one of said plurality of switches upon rotation thereof, and a circular contact cam mounted on said cam arm for actuating a third one of said plurality of switches after a predetermined rotational period of said cam arm, and second explosive responsive means for effecting release of said cam arm for rotational movement.

References Cited in the file of this patent

UNITED STATES PATENTS

| 1,299,340 | Heinrich | Apr. 1, 1919 |
| 1,596,263 | Walton | Aug. 17, 1926 |
| 2,187,406 | Staples | Jan. 16, 1940 |
| 2,439,732 | Haydon | Apr. 13, 1948 |
| 2,585,870 | Spielman | Feb. 12, 1952 |
| 2,732,765 | Boyd | Jan. 31, 1956 |